US008782626B2

(12) United States Patent
England et al.

(10) Patent No.: US 8,782,626 B2
(45) Date of Patent: Jul. 15, 2014

(54) SEARCH SUGGESTIONS FOR STATIC CODE ANALYSIS

(75) Inventors: Laurence England, San Jose, CA (US); Derek Gebhard, Seattle, WA (US); Ramya Karri, San Ramon, CA (US); Jason Ryder, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 12/828,267

(22) Filed: Jun. 30, 2010

(65) Prior Publication Data

US 2012/0005540 A1 Jan. 5, 2012

(51) Int. Cl.
*G06F 9/45* (2006.01)
*G06F 9/44* (2006.01)

(52) U.S. Cl.
USPC ............ 717/152; 717/101; 717/103; 717/123

(58) Field of Classification Search
CPC .............. G06F 8/20; G06F 8/73; G06F 8/443
See application file for complete search history.

(56) References Cited

U.S. PATENT DOCUMENTS

| | | | | |
|---|---|---|---|---|
| 6,397,212 | B1* | 5/2002 | Biffar | 707/704 |
| 7,607,066 | B2* | 10/2009 | Gertz et al. | 714/758 |
| 7,917,900 | B2* | 3/2011 | Rajamani et al. | 717/152 |
| 8,166,451 | B2* | 4/2012 | Gutz | 717/103 |
| 8,352,904 | B2* | 1/2013 | Hodges | 717/101 |
| 8,364,695 | B2* | 1/2013 | Berkowitz et al. | 707/768 |
| 8,516,443 | B2* | 8/2013 | Li et al. | 717/123 |
| 8,584,079 | B2* | 11/2013 | Yassin et al. | 717/101 |
| 2004/0003335 | A1* | 1/2004 | Gertz et al. | 714/758 |
| 2006/0248078 | A1* | 11/2006 | Gross et al. | 707/5 |
| 2007/0169027 | A1* | 7/2007 | Drepper | 717/140 |
| 2008/0263505 | A1* | 10/2008 | StClair et al. | 717/101 |
| 2009/0210854 | A1* | 8/2009 | Carteri et al. | 717/102 |
| 2010/0306754 | A1* | 12/2010 | Javed et al. | 717/152 |

OTHER PUBLICATIONS

S. Heckman, Adaptive Probabilistic Model for Ranking Code-Based Static Analysis Alerts, May 2007, 2 pages.*
Moser et al., A comparative analysis of the efficiency of change metrics and static code attributes for defect prediction, May 2008, 10 pages.*
Abi-Antoun et al., A static analysis for extracting runtime views from annotated object-oriented code, Oct. 2006, 2 pages.*

* cited by examiner

*Primary Examiner* — Thuy Dao
(74) *Attorney, Agent, or Firm* — Steven M. Greenberg, Esq.; CRGO Law

(57) ABSTRACT

Embodiments of the present invention provide a method, system and computer program product for heuristically generated suggestions in static code analysis. In an embodiment of the invention, a method for heuristically suggesting an asset transition in a code analysis tool can include receiving from an end user a request to select an asset of a computer program subject to static code analysis by a code analysis tool and selecting in response and contemporaneously to the request, an asset from amongst many assets during static code analysis of a computer program in a code analysis tool. The method further can include determining a set of assets amongst the many assets historically selected by other users of the code analysis tool during static code analysis subsequent to a selection of the contemporaneously selected asset. Finally, the method can include displaying to the end user a suggestion of a next asset for selection that had been frequently selected by the other users of the code analysis tool during static code analysis of the assets of the computer program subsequent to a selection of the contemporaneously selected asset.

16 Claims, 1 Drawing Sheet

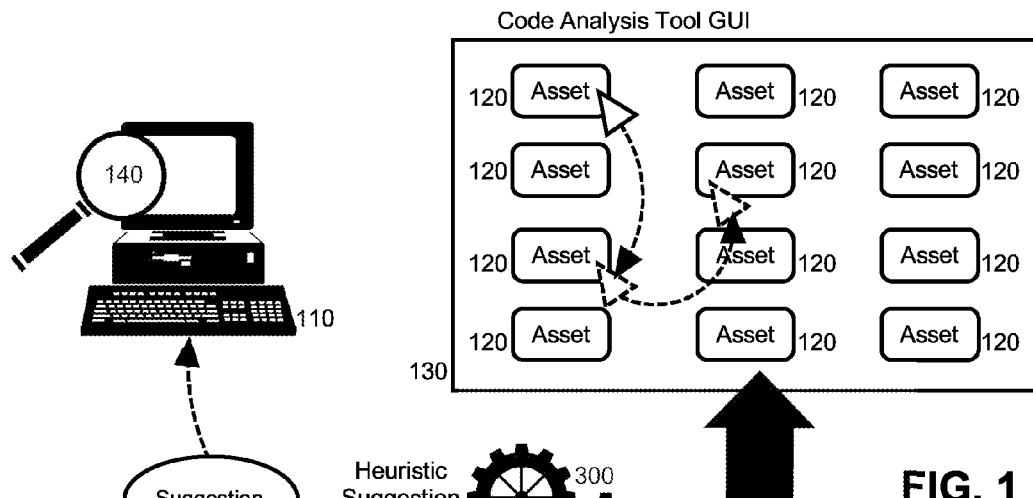
FIG. 1
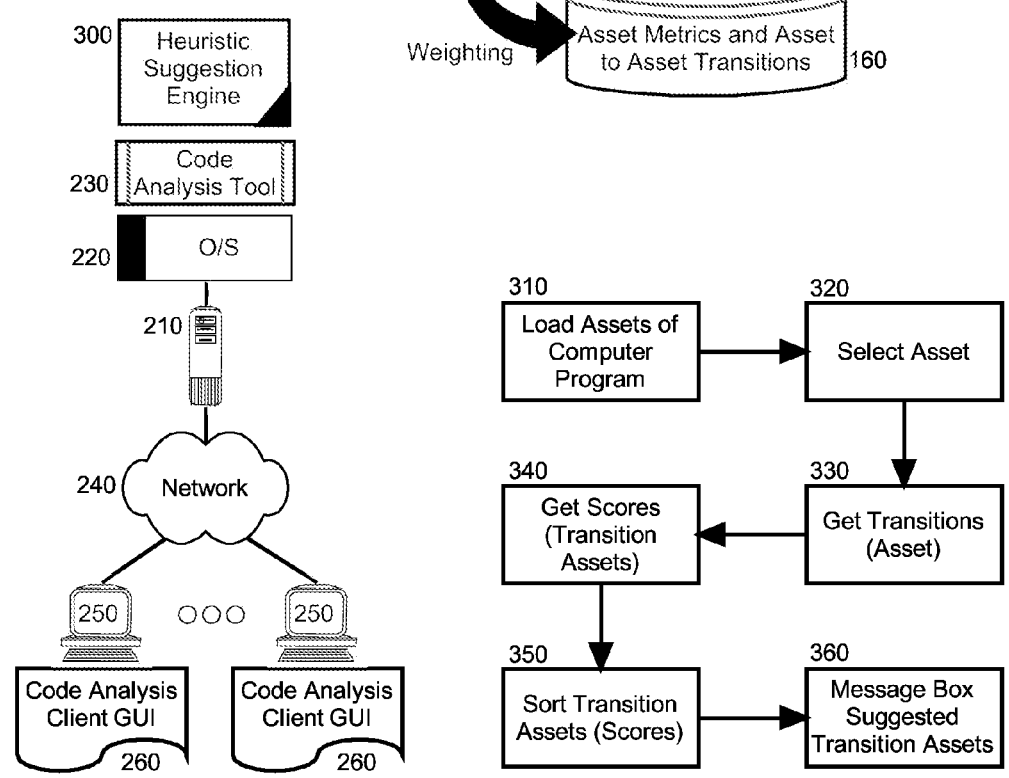
FIG. 2   FIG. 3

SEARCH SUGGESTIONS FOR STATIC CODE ANALYSIS

BACKGROUND OF THE INVENTION

1. Field of the Invention

The present invention relates to code archeology and more particularly to searching artifacts in using static code analysis.

2. Description of the Related Art

Code archeology refers to the process of uncovering the behavior of existing source code of a computer program for either modification, re-write or retirement. Static code analysis, as opposed to dynamic code analysis, both tools of code archeology, refers to the analysis of a computer program performed without executing the computer program. In most cases static code analysis is performed on a version of the source code and in other cases, some form of the object code compiled from the source code. The skilled artisan will recognize a distinction between static code analysis and code review or program comprehension to the extent that the former is an automated process performed by a tool, while the latter is a manual process performed by a human being. The sophistication of static code analysis performed by a tool varies from those that only consider the behavior of individual statements and declarations of source code, to those that include the complete source code of a computer program in the analysis. Resultant use of the information obtained from the analysis vary from highlighting possible coding errors in a computer program to formal methods that mathematically prove properties about a given computer program.

For most, static code analysis is a methodology of detecting errors in program code based on the programmer review source code marked by an analyzer of the tool in those places of source code where potential errors may occur. In other words the static analysis tool detects in the program text the places containing or likely to contain errors, subject to errors or possessing bad formatting. Such code sections are to be considered by the programmer for the programmer to decide whether or not to modify the subject code section. Static analyzers can be both of general purpose and specialized for searching certain error classes. Though complicated in nature, static code analyzers allow developers to detect a substantial number of errors at the earliest possible stage of program code development. In this regard, the earlier an error can be determined, the lower is the cost of its correction.

Static code analysis applied to a computer program of only a handful of source code files and corresponding resources, collectively referred to as "assets", can be complicated for the uninitiated. Managing static code analysis for a computer program of hundreds of assets distributed across multiple different servers can be near impossible without significant experience. Thus, the use of static code analysis to achieve the enormous benefit resulting therefrom can be elusive for many developers lacking the requisite experience in static code analysis.

BRIEF SUMMARY OF THE INVENTION

Embodiments of the present invention address deficiencies of the art in respect to static code analysis and provide a novel and non-obvious method, system and computer program product for heuristically generated suggestions in static code analysis. In this regard, a next asset to be selected from a contemporaneously selected asset can be suggested heuristically based upon the past selection of different assets from the contemporaneously selected asset by different end users. Consequently, the expertise and experience of the different end users, measured through frequent or infrequent selection of assets from a selection of the contemporaneously selected asset can be leveraged in the form of a suggestion by an end user less familiar with the assets of the computer program subject to static code analysis.

In an embodiment of the invention, a method for heuristically suggesting an asset transition in a code analysis tool can include receiving from an end user a request to select an asset of a computer program subject to static code analysis by a code analysis tool and selecting in response and contemporaneously to the request, an asset from amongst many assets during static code analysis of a computer program in a code analysis tool. The method further can include determining a set of assets amongst the many assets historically selected by other users of the code analysis tool during static code analysis subsequent to a selection of the contemporaneously selected asset. Finally, the method can include displaying to the end user a suggestion of a next asset for selection that had been frequently selected by the other users of the code analysis tool during static code analysis of the assets of the computer program subsequent to a selection of the contemporaneously selected asset.

In one aspect of the embodiment, a score is computed for each of the assets in the set of assets. Each score indicates a frequency of selection of a corresponding asset by different end users. Thereafter, a suggestion of a next asset for selection having a highest score is displayed to the end user. In another aspect of the embodiment, a score is computed for each of the assets in the set of assets, each score indicating a frequency of selection of a corresponding asset by different end users, and each score being weighted to favor more recent selection of a corresponding asset. Again, thereafter, a suggestion of a next asset for selection having a highest weighted score is displayed to the end user. In yet another aspect of the embodiment, a score is computed for each of the assets in the set of assets, each score indicating a frequency of selection of a corresponding asset by different end users and also a duration of time in which the corresponding asset had remained selected. As before, thereafter a suggestion of a next asset for selection having a highest score is displayed to the end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for heuristically generated suggestions in static code analysis;

FIG. 2 is a schematic illustration of a code analysis data processing system configured for heuristically generated suggestions in static code analysis; and, FIG. 3 is a flow chart illustrating a process for heuristically generated suggestions in static code analysis.

DETAILED DESCRIPTION OF THE INVENTION

Embodiments of the invention provide for heuristically generated suggestions in static code analysis. In accordance with an embodiment of the invention, user interface interactions in a code analysis tool between an operator and a code base of multiple different assets can be observed and recorded. In particular, metrics for the interactions including a period of time a particular one of the assets has been selected before a different one of the assets is selected can be recorded. Further, an identification of transitions from one of the assets to another can be recorded. The metrics can be transformed into a score for each asset. Optionally, the score can be weighted to favor assets selected more recently than others of the assets. Finally, a suggestion to select one of the assets based upon a contemporaneously selected asset can be generated and displayed in the code analysis tool based upon a score assigned to assets previously transitioned to from the contemporaneously selected asset.

In further illustration, FIG. 1 pictorially shows a process for heuristically generated suggestions in static code analysis. As shown in FIG. 1, a monitor 140 can observe user interactions in a code analysis tool graphical user interface 130 for a code analysis tool 110. Specifically, those interactions can include both the selection of different assets 120 of a computer program subject to static code analysis, and also transitions between the selection of different ones of the assets 120. Metrics for the selection of the assets 120, such as an identity of selected assets and a period of time for which a given one of the assets 120 remains selected before a transition occurs to a different one of the assets 120 can be stored in a data store 160 of metrics and transitions.

The metrics further can be scored according to an amount of time in which a corresponding one of the assets 120 had remained selected, but weighted based upon a temporal proximity of the metrics having been collected for the assets 120 such that the metrics collected more recently for the assets 120 are valued more than other metrics. Optionally, the metrics for an asset 120 previously selected by an end user considered to have a degree of expertise can be valued more than the metrics of an asset 120 previously selected by an end user lacking such degree of expertise. As such, heuristic suggestion engine 300 responsive to the contemporaneous selection of one of the assets 120 can lookup transitions emanating from the selected one of the assets 120 to identify possible ones of the assets 120 for subsequent selection.

Past selected ones of the assets 120 along a path leading to the contemporaneously selected one of the assets 120 can be compared to the historical transitions leading up to each of the possible ones of the assets 120 to filter the identified assets 120 by priority. Even yet further, the filtered identified assets 120 can be sorted according to a highest score in the data store 160. Finally, one or more of the highest ranking assets 120 that have been filtered and sorted can be presented visually through the code analysis graphical user interface 130 as a suggestion 150 for selection by the end user.

The process described in connection with FIG. 1 can be implemented in a code analysis data processing system. In yet further illustration, FIG. 2 schematically shows a code analysis data processing system configured for heuristically generated suggestions in static code analysis. The system includes a host server 210 hosting an operating system 220 that in turn supports the execution of a code analysis tool. The code analysis tool 230 can be accessed by different end users over computer communications network 240 through respective code analysis client graphical user interfaces 260 provided through client computers 250. In this way, end users can perform code analysis on the different assets of source code and the interactions of the each of the end users in performing the code analysis through respective ones of the code analysis client graphical user interface 260 can be recorded as metrics, and scored to form the basis of the heuristic generation of suggestions for subsequent usage of the code analysis tool 230 on the assets of the source code.

Of note, heuristic suggestion engine 300 can be coupled to the code analysis tool 230. The heuristic suggestion engine 300 can include program code that when executed in memory by at least one processor of the host server 210, can store metrics for the selection of different assets of source code in the code analysis tool 230 by different end users. The metrics can include not only the identity of different selected assets, but also a duration of selection for each selected asset, and also a transition from one asset to another so that a historical path of selection of assets can be determined. Optionally, the metrics can include a frequency of selection over a sliding window of time, or a lack of selection during a sliding window of time. The program code of the heuristic suggestion engine 300 further can be enabled to score the metrics for each selected asset by transforming the metrics to a uniform system of values. Periodically, the scores for each asset can be weighted by the program code of the heuristic suggestion engine 300 to afford greater significance to more recently computed scores and afford lesser significance to temporally more distant computed scores. In any event, the weighted scores for each asset can be combined to form a composite score for each of the assets.

When an end user interacts with the code analysis tool 230, a contemporaneously selected asset can be determined and the program code of the heuristic suggestion engine 300 can determine a set of assets historically transitioned to from the contemporaneously selected asset. One or more prior selected assets to the contemporaneously selected asset also can be determined and compared to a historical path of assets leading to each asset in the set of assets historically transitioned to from the contemporaneously selected asset. A subset of the assets in the set can be determined having a most common path of ancestral assets with that of the contemporaneously selected asset and the assets in the subset can be sorted according to highest composite score. Finally, the heuristic suggestion engine 300 can generate a user interface control such as a message box in a code analysis client graphical user interface 260 for the end user suggesting a next asset to be selected according to the assets in the subset with the highest composite score.

In even yet further illustration of the operation of the heuristic suggestion engine 300, FIG. 3 is a flow chart illustrating a process for heuristically generated suggestions in static code analysis. Beginning in block 310, the assets of a computer program can be loaded for static code analysis in a static code analysis tool. In block 320, an asset can be selected contemporaneously through a graphical user interface of the code analysis tool. Subsequently, historically selected transitions by other end users from the contemporaneously selected asset can be identified and, in particular, a set of assets historically transitioned to from the contemporaneously selected asset can be determined. In block 340, the scores for the assets in the set can be retrieved and in block 350, the assets in the set can be sorted according to highest score. Finally, in block 360, a message box can be rendered in the graphical user interface for the code analysis tool suggesting one or more assets in the set having the highest associated score.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for heuristically suggesting an asset transition in a code analysis tool statically analyzing assets of a computer program, the method comprising:
   receiving from an end user a request to select an asset of a computer program subject to static code analysis by a code analysis tool executing in memory by at least one processor of a computer;
   selecting in response and contemporaneously to the request an asset from amongst a plurality of assets during static code analysis of a computer program in a code analysis tool;
   determining a set of assets amongst the plurality of assets historically selected by other users of the code analysis tool during static code analysis subsequent to a selection of the contemporaneously selected asset; and,
   displaying to the end user a suggestion of a next asset for selection that had been frequently selected by the other users of the code analysis tool during static code analysis of the assets of the computer program subsequent to a selection of the contemporaneously selected asset.

2. The method of claim 1, wherein displaying to the end user a suggestion of a next asset for selection that had been frequently selected by the other users of the code analysis tool during static code analysis of the assets of the computer program subsequent to a selection of the contemporaneously selected asset, comprises:
   computing a score for each of the assets in the set of assets, each score indicating a frequency of selection of a corresponding asset by different end users; and,
   displaying to the end user a suggestion of a next asset for selection having a highest score.

3. The method of claim 1, wherein displaying to the end user a suggestion of a next asset for selection that had been frequently selected by the other users of the code analysis tool during static code analysis of the assets of the computer program subsequent to a selection of the contemporaneously selected asset, comprises:
   computing a score for each of the assets in the set of assets, each score indicating a frequency of selection of a corresponding asset by different end users, each score being weighted to favor more recent selection of a corresponding asset;
   displaying to the end user a suggestion of a next asset for selection having a highest weighted score.

4. The method of claim 1, wherein displaying to the end user a suggestion of a next asset for selection that had been frequently selected by the other users of the code analysis tool during static code analysis of the assets of the computer program subsequent to a selection of the contemporaneously selected asset, comprises:
   computing a score for each of the assets in the set of assets, each score indicating a frequency of selection of a corresponding asset by different end users and also a duration of time in which the corresponding asset had remained selected; and,
   displaying to the end user a suggestion of a next asset for selection having a highest score.

5. The method of claim 1, wherein displaying to the end user a suggestion of a next asset for selection that had been frequently selected by the other users of the code analysis tool during static code analysis of the assets of the computer program subsequent to a selection of the contemporaneously selected asset, comprises:
   computing a score for each of the assets in the set of assets, each score indicating a frequency of selection of a corresponding asset by different end users and also a duration of time in which the corresponding asset had remained selected, each score being weighted to favor more recent selection of a corresponding asset;
   displaying to the end user a suggestion of a next asset for selection having a highest weighted score.

6. A static code analysis data processing system comprising:
   a host computer comprising memory and at least one processor;
   a code analysis tool executing in the host computer and statically analyzing a plurality of assets of a computer program on behalf of an end user; and,
   a heuristic suggestion engine coupled to the code analysis tool, the engine comprising program code enabled to determine a set of assets amongst the plurality of assets historically selected by other end users of the code analysis tool during static code analysis of the plurality of assets subsequent to a contemporaneous selection by the end user of an asset, and to display in the code analysis tool to the end user a suggestion of a next asset for selection that had been frequently selected by the other users of the code analysis tool during static code analysis of the plurality of assets of the computer program subsequent to a selection of the contemporaneously selected asset.

7. The system of claim 6, further comprising a data store of asset metrics indicating how often the other end users had selected an asset subsequent to a selection of another asset, the program code of the heuristic suggestion engine accessing the data store to determine a frequency of selection by other end users of the code analysis tool during static code analysis of the plurality of assets of the computer program subsequent to a selection of the contemporaneously selected asset.

8. The system of claim 6, wherein the data store further comprises a composite score for each asset, the composite score indicating how often the other end users had selected an asset subsequent to a selection of another asset, the program code of the heuristic suggestion engine accessing the data store and utilizing the composite score to suggest the next asset for selection.

9. The system of claim 6, wherein the data store further comprises a composite score for each asset, the composite score indicating how often the other end users had selected an asset subsequent to a selection of another asset and a duration for which an asset had remained selected, the program code of the heuristic suggestion engine accessing the data store and utilizing the composite score to suggest the next asset for selection.

10. The system of claim 8, wherein the composite score is weighted to favor more recently selected assets.

11. The system of claim 9, wherein the composite score is weighted to favor more recently selected assets.

12. A computer program product for heuristically suggesting an asset transition in a code analysis tool, the computer program product comprising:

a computer readable storage memory having computer readable program code embodied therewith, the computer readable program code comprising:

computer readable program code for receiving from an end user a request to select an asset of a computer program subject to static code analysis by a code analysis tool executing in memory by at least one processor of a computer;

computer readable program code for selecting in response and contemporaneously to the request an asset from amongst a plurality of assets during static code analysis of a computer program in a code analysis tool;

computer readable program code for determining a set of assets amongst the plurality of assets historically selected by other users of the code analysis tool during static code analysis subsequent to a selection of the contemporaneously selected asset; and, computer readable program code for displaying to the end user a suggestion of a next asset for selection that had been frequently selected by the other users of the code analysis tool during static code analysis of the assets of the computer program subsequent to a selection of the contemporaneously selected asset.

13. The computer program product of claim 12, wherein the computer readable program code for displaying to the end user a suggestion of a next asset for selection that had been frequently selected by the other users of the code analysis tool during static code analysis of the assets of the computer program subsequent to a selection of the contemporaneously selected asset, comprises:

computer readable program code for computing a score for each of the assets in the set of assets, each score indicating a frequency of selection of a corresponding asset by different end users; and, computer readable program code for displaying to the end user a suggestion of a next asset for selection having a highest score.

14. The computer program product of claim 12, wherein the computer readable program code for displaying to the end user a suggestion of a next asset for selection that had been frequently selected by the other users of the code analysis tool during static code analysis of the assets of the computer program subsequent to a selection of the contemporaneously selected asset, comprises:

computer readable program code for computing a score for each of the assets in the set of assets, each score indicating a frequency of selection of a corresponding asset by different end users, each score being weighted to favor more recent selection of a corresponding asset;

computer readable program code for displaying to the end user a suggestion of a next asset for selection having a highest weighted score.

15. The computer program product of claim 12, wherein the computer readable program code for displaying to the end user a suggestion of a next asset for selection that had been frequently selected by the other users of the code analysis tool during static code analysis of the assets of the computer program subsequent to a selection of the contemporaneously selected asset, comprises:

computer readable program code for computing a score for each of the assets in the set of assets, each score indicating a frequency of selection of a corresponding asset by different end users and also a duration of time in which the corresponding asset had remained selected; and, computer readable program code for displaying to the end user a suggestion of a next asset for selection having a highest score.

16. The computer program product of claim 12, wherein the computer readable program code for displaying to the end user a suggestion of a next asset for selection that had been frequently selected by the other users of the code analysis tool during static code analysis of the assets of the computer program subsequent to a selection of the contemporaneously selected asset, comprises:

computer readable program code for computing a score for each of the assets in the set of assets, each score indicating a frequency of selection of a corresponding asset by different end users and also a duration of time in which the corresponding asset had remained selected, each score being weighted to favor more recent selection of a corresponding asset;

computer readable program code for displaying to the end user a suggestion of a next asset for selection having a highest weighted score.

\* \* \* \* \*